Feb. 22, 1949. G. MUHLACK 2,462,121
JIG FOR FORMING MITERED PIPE JOINTS
Filed March 5, 1946

INVENTOR.
GEORGE MUHLACK
BY
M. O. Hayes
ATTORNEY

UNITED STATES PATENT OFFICE 2,462,121

JIG FOR FORMING MITERED PIPE JOINTS

George Muhlack, Philadelphia, Pa.

Application March 5, 1946, Serial No. 652,205

3 Claims. (Cl. 113—102)

(Granted under the act of March 3, 1883, as amended April 30, 1928; 370 O. G. 757)

The present invention concerns a jig for holding mitered pieces of pipe during the operation of forming such pieces into a pipe elbow.

In forming a pipe elbow it is customary to cut a plurality of pieces of pipe having beveled edges that, when fitted together, form miter joints. The usual procedure is to tack-weld such miter joints and difficulty is encountered in retaining the pieces to be welded in proper position during the welding operation.

An object of the invention is to provide a jig for holding mitered pieces of pipe while joints between the pieces are tack-welded to form an elbow.

Figure 1:
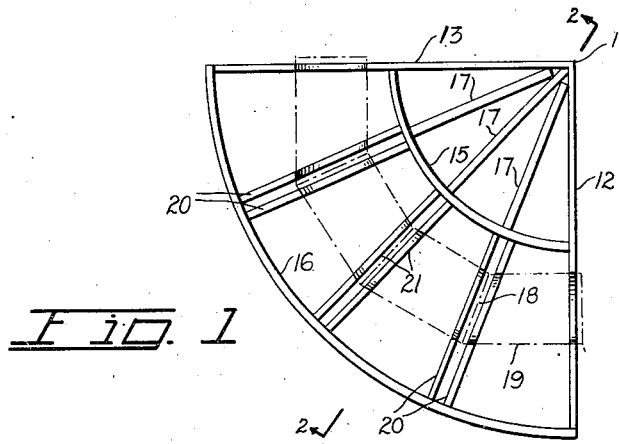

Further objects and advantages of this invention, as well as its construction, arrangement and operation, will be apparent from the following description and claims in connection with the accompanying drawings, in which Fig. 1 is a top elevational view of a preferred embodiment of the invention.

Figure 2:
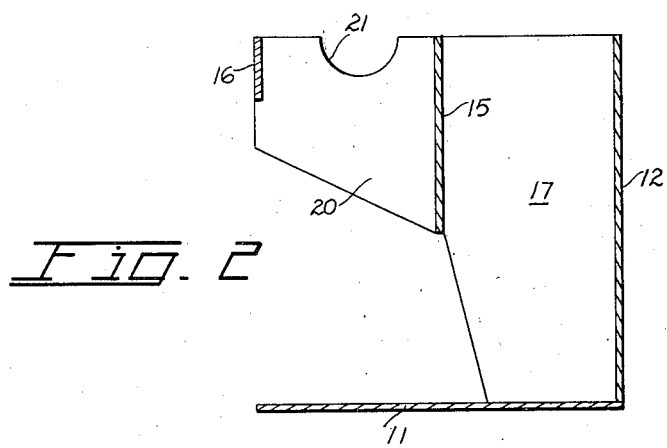

Fig. 2 is a sectional view taken substantially along line 2—2 of Fig. 1.

The jig of the present invention comprises a framework including a horizontal base plate 11 and a pair of vertically extending side plates 12 and 13, disposed at right angles to each other and joined at seam 14. Extending between plates 12 and 13 at the top thereof is an arcuate member 15 having its center of curvature at seam 14. Extending between plates 12 and 13 at the extremities thereof and spaced from member 15 is a second arcuate member 16 having a center of curvature at seam 14. Extending from seam 14 to arcuate member 15 are spaced members 17, disposed in radial relation and each of which defines the plane of one of the miter joints 18 of the pipe elbow 19 shown in phantom lines.

Extending between arcuate members 15 and 16 are pairs of members 20 vertically disposed and arranged in spaced relation with the plane defined by corresponding member 17 midway therebetween. Each pair of members 20 is provided with a pair of aligned recesses 21 in the upper edges thereof to serve as a cradle to accommodate the adjacent ends of mitered pipe forming a miter joint 18.

In operation the jig is used by placing the sections of pipe to be formed into an elbow as shown in phantom lines in Fig. 1 with the miter joints disposed between the parallel plates 20. The tack welding can then be performed to provide the miter joints and the assembled elbow can be removed as a unit from the jig.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A jig for manufacturing a mitered pipe elbow comprising a framework including a horizontal base plate, a series of vertical radially arranged plates, each plate defining a miter joint plane of the elbow, a vertical arcuate plate joining the extremities of said plates, a second arcuate plate spaced from said first arcuate plate and concentric therewith, and a series of vertical pairs of plates between said arcuate plates, each of said pairs of plates being in spaced relation with a miter-joint plane centrally therebetween, each pair of parallel spaced plates having aligned recesses in the upper edges thereof forming a cradle for adjacent mitered ends of the elbow joint.

2. A jig for holding the pieces of an object forming a miter joint, said jig comprising a framework including a pair of side plates, and at least one pair of support plates between said side plates and arranged with the side and support plates in substantially radial relation to each other, said pair of support plates being substantially parallel and in spaced relation with a miter joint adapted to be located between the support plates, said pair of parallel support plates having aligned recesses in the edges thereof forming a cradle for the adjacent mitered ends of the pieces of the object.

3. A jig for holding the pieces of an object forming a miter joint, said jig comprising a framework including a pair of side plates, and a plurality of pairs of support plates between said side plates and arranged with the side plates and pairs of support plates in substantially radial relation to each other, each pair of support plates being substantially parallel and in spaced relation with a miter joint adapted to be located between the pair of support plates, each pair of parallel support plates having aligned recesses in the edges thereof forming a cradle for the adjacent mitered ends of the pieces of an object.

GEORGE MUHLACK.

REFERENCES CITED

The following references are of record in the file of this patent:

UNITED STATES PATENTS

| Number | Name | Date |
|---|---|---|
| 319,139 | Seward et al. | June 2, 1885 |
| 837,768 | Allen | Dec. 4, 1906 |
| 1,969,572 | Maurer | Aug. 7, 1934 |